May 6, 1969

R. W. WARREN ET AL 3,442,124

FLUID VELOCIMETER

Filed Dec. 5, 1966

INVENTORS,
RAYMOND W. WARREN
CARL J. CAMPAGNUOLO
JONATHAN E. FINE
BY Harry M. Saragovitz,
Edward J. Kelly, Herbert Berl
& J. D. Edgerton
ATTORNEYS

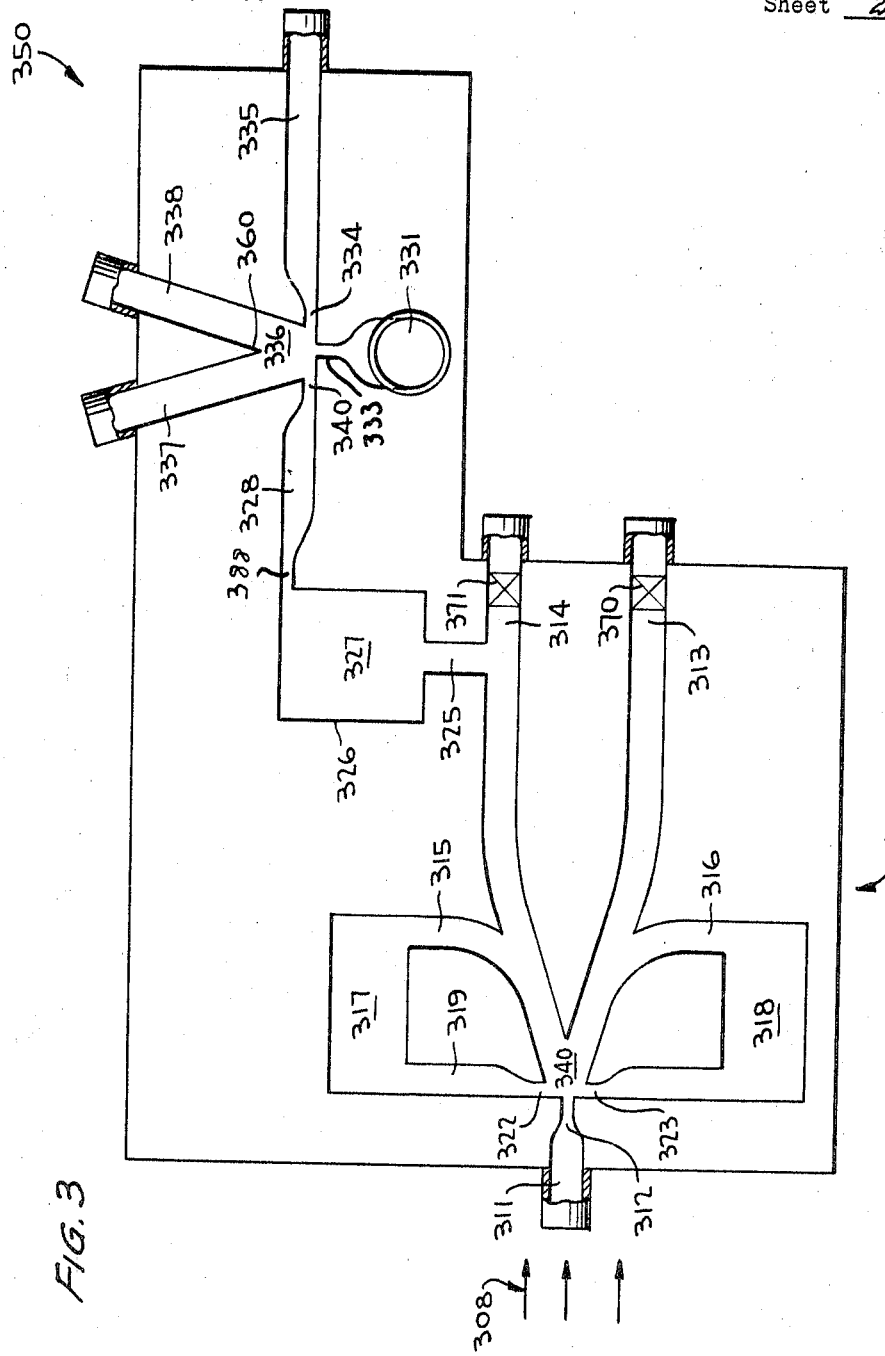

United States Patent Office 3,442,124
Patented May 6, 1969

3,442,124
FLUID VELOCIMETER
Raymond W. Warren, McLean, Va., Carl J. Campagnuolo, Chevy Chase, Md., and Jonathan E. Fine, Washington, D.C., assignors to the United States of America as represented by the Secretary of the Army
Filed Dec. 5, 1966, Ser. No. 599,689
Int. Cl. G01f 1/00
U.S. Cl. 73—194                            8 Claims

ABSTRACT OF THE DISCLOSURE

A fluid whose velocity it is desired to measure is passed through a fluid resonator which is coupled to a fluid amplifier. If the fluid in the resonator resonates, indicating a certain fluid velocity range, a low pressure signal is received by the amplifier while, if the resonator is not at resonance, a high pressure signal is sent to the amplifier. Depending on the type of pressure signal sent to the fluid amplifier a particular type of signal is transmitted from the amplifier indicating whether said fluid is in said certain velocity range or not.

---

This invention relates to fluid measurement and in particular to a no-moving-part device to indicate certain fluid velocity ranges of a compressible test fluid.

In many situations it is desirable to know if a compressible test fluid is in a designated velocity range. Similarly, in aircraft systems it is often desirable to determine if the aircraft is operating in a certain velocity range by measuring the velocity of the ram air of the aircraft. In the past various types of control systems have been employed to indicate a designated compressible test fluid velocity range. Some of these systems have employed devices utilizing moving parts which, because of wear, friction, and thermal expansion, did not provide the dependability and accuracy required by the particular situation. Electrical control systems have been found to be defective in producing dependable results in flight systems because of their instability due to inherent environmental vibrations.

Pure fluid systems have recently been developed and are of particular value because of their lack of moving parts which eliminates friction and wear inherent in mechanical devices. Pure fluid systems perform and achieve control functions by the momentum interchange of two or more fluids and hence environmental vibrations do not present a problem as in electrical systems.

It is therefore an object of the present invention to provide means to indicate a particular velocity range of a compressible test fluid.

It is a further object of the present invention to provide means to accurately indicate a particular velocity range of a compressible test fluid and eliminate effects of environmental vibrations.

Still another object of the present invention is to provide means to indicate if a compressible test fluid is in a particular velocity range by directing a fluid signal out a selected conduit.

Briefly, the compressible test fluid is passed through a fluid resonator which is designed to resonate when the fluid passing through it is in the selected velocity range. A control nozzle of a bistable fluid amplifier having a power jet and two output conduits is coupled ot the resonator. During resonance the amplifier will discharge from one of the output conduits and at other times will discharge from the other output conduit.

Other objects and aspects of the invention will be apparent from the description and drawings wherein:

FIGURE 3 is a schematic representation of a third embodiment of the present invention.

Figure 1:
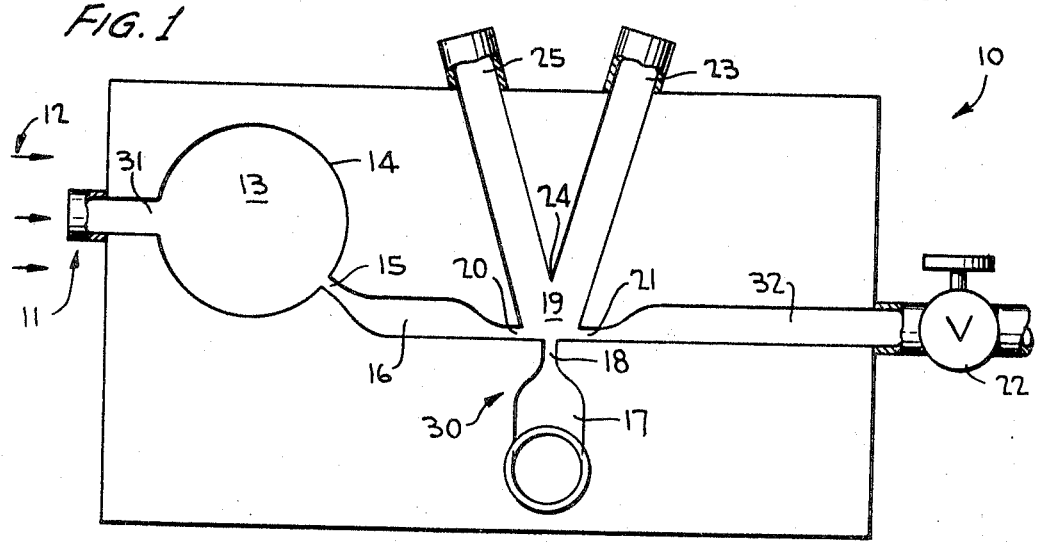
FIGURE 1 is a schematic representation of one embodiment of the invention.

In the embodiment of the invention of FIGURE 1 a fluid velocimeter 10 has a ram tube 11 which is placed in the path of ram or test compressible fluid (hereinafter referred to as test fluid) flowing in the direction of arrow 12. Ram tube 11 communicates, by a port 31, with a Helmholtz resonator 14 which has a resonator chamber 13 that is a fixed volume. While a circular shaped resonator chamber is shown obviously any configuration could be used. A discharge port 15, by a conduit 16, communicates the resonator chamber 13 with a left control nozzle 20 of a bistable amplifier 30. Port 31 has a larger cross-sectional area than port 15 for reasons which will later become apparent. The bistable amplifier 30 has a power source (not shown) which communicates with an inlet conduit 17 which, by a power nozzle 18, directs power fluid into an interaction chamber 19. A right control conduit 32 communicates with the ambient and by a right control nozzle 21 communicates with interaction chamber 19. Output conduits 23 and 25 communicate with interaction chamber 19 and selectively receive the power fluid from power nozzle 18 in a manner well known in the art. An adjustable bias valve 22 is placed in conduit 32 and serves to regulate the communication of ambient air with right control nozzle 21.

Ram tube 11 directs the test fluid through port 31 to resonator chamber 13. Helmholtz resonator 14 will resonate when the velocity of the test fluid flowing through it corresponds with the resonant velocity of the resonator. In nonresonant conditions, such as when the velocity of the test fluid is above or below the resonant velocity, the test fluid will merely pass through resonator chamber 13 to conduit 16 where it will communicate with the control nozzle 20 directing power fluid from nozzle 18 to output conduit 23 in a manner well known in the art. When the test fluid is at the resonant velocity of resonator chamber 13 the pressure in the resonator chamber will be greatly amplified. This will force fluid out resonator chamber 13 via port 31 and ram tube 11 to ambient. The pressure in the resonator will discharge from port 31 in preference to port 15 since port 31 has a larger cross-sectional area than port 15 presenting a lower impedance to flow from the resonator chamber. The flow of fluid from resonator chamber 13 out ram tube 11 will create a suction in conduit 16 which with the entrainment of fluid by the power jet, will create a low pressure region in the vicinity of left control nozzle 20. Right control nozzle 21 will be at atmospheric pressure by conduit 32 and when coupled with the low pressure at left control nozzle 20 will switch the power fluid from right output conduit 23 to left output conduit 25. If the velocity of the test fluid should change to a value either above or below that of the resonant velocity of Helmholtz resonator 14 it is obvious that the fluid in chamber 13 will no longer be at resonance and will be directed to left control nozzle 20 switching the power fluid from left output conduit 25 to right output conduit 23.

The resonant velocity of Helmholtz resonator 14 can be selected by picking a particular volume or resonator chamber 13. Bias valve 22 can be adjusted in a manner well known in the art to vary the pressure in the vicinity of control nozzle 21, and hence the time when the power fluid in amplifier 30 will be switched under the influence of resonator 14. It is preferred that bias valve 22 should partially restrict the communication of right control nozzle 21 with atmosphere. If there is no velocity of the test fluid, the power fluid from nozzle 18 will entrain fluid from right control nozzle 21 creating a low pressure region there allowing the higher pressure of ambient in nozzle 20 to direct fluid to right output conduit 23. Since valve 22 will partially restrict the communication of right control nozzle 21 with atmosphere the fluid entrained by the power fluid from nozzle 18 in the vicinity of right control nozzle 21 cannot be replaced by atmospheric air fast enough to avoid a low pressure region in the vicinity of right control nozzle 21. In the absence of a test fluid velocity left control nozzle 20 will not be at a low pressure as the result of entrainment by power fluid since the control nozzle will have an unrestricted communication with ambient by conduit 16, chamber 13 and ram tube 11.

It can thus be seen that we have provided means to direct power fluid out conduit 25 only if the velocity of the test fluid is in a certain range.

Figure 2:
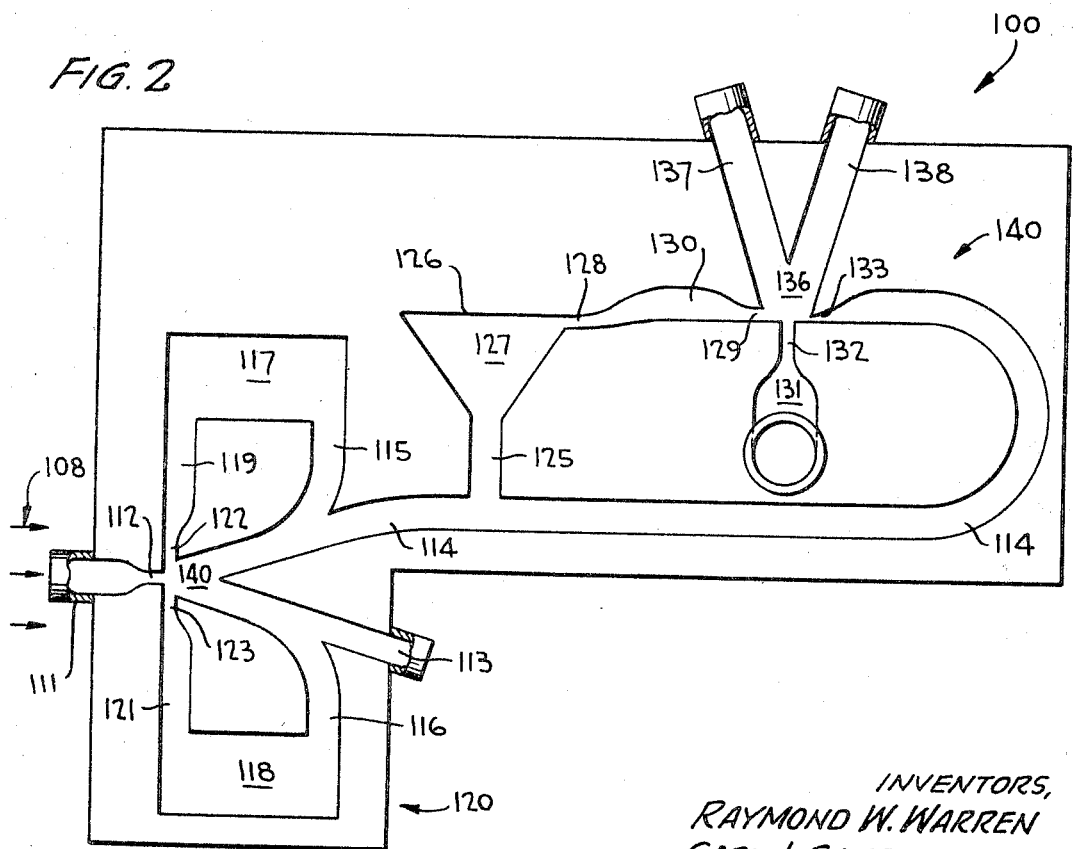
FIGURE 2 is a schematic representation of a second embodiment of the present invention.

In the embodiment of the invention schematically illustrated in FIGURE 2 a ram air tube 111 communicates with nozzle 112 of a pressure dependent oscillator 120. The pressure dependent oscillator is any oscillator whose frequency is a function of input pressure and could be constructed in accordance with FIGURE 2 of U.S. Patent #3,158,166 to Warren for a "Negative Feedback Oscillator." Oscillator 120 has an interaction chamber 140 which communicates with a left outlet conduit 114 and a right outlet conduit 113, the latter conduit being communicated with atmosphere. A left feedback leg 115 is communicated with left output conduit 114 downstream of interaction chamber 140. A left fluid capacitance 117 and a left fluid conduit 119 communicate left fluid capacitance with a left control nozzle 122 which is adjacent nozzle 112. A right feedback leg 116, a right fluid capacitance 118, a right control conduit 121 and a right control nozzle 123 are oppositely positioned. Left output conduit 114 communicates with a restricted right control nozzle 133 of a bistable fluid amplifier 140. A conduit 125 is in parallel with conduit 114 and leads to a Helmholtz resonator 126 which has a resonator chamber 127. Obviously any geometrical configuration could be used for resonator chamber 127. A port 128 of smaller cross-sectional area than conduit 125, communicates, via conduit 130, with a right control nozzle 129 of bistable amplifier 140. The amplifier has a power source (not shown) which communicates with inlet conduit 131 and, by a power nozzle 132, with an interaction chamber 136. A left output conduit 137 and a right output conduit 138 are down stream of interaction chamber 136 and selectively receive the power fluid from power nozzle 132 in a manner well known in the art. Helmholtz resonator 126 is designed to resonate at a particular frequency and to act as a capacitor at non-resonant frequencies. At resonance the resonator will shunt the fluid from conduit 125 to conduit 114 while at non-resonant frequencies the resonator will allow flow to enter resonator chamber 127. A theoretical discussion of this phenomenon can be found in "Fundamentals of Acoustics" (second edition) by Kinsler and Frey (published by John Wiley and Sons, 1962).

Ram tube 111 is placed in a stream of a test fluid having a velocity vector corresponding to arrows 108. The ram tube will convert the test fluid to a pressure source which will feed the pressure dependent oscillator 120. The oscillator will produce an oscillating fluid output to conduits 113 and 114 whose frequency will be a function of the pressure input. Since the pressure input is a measurement of the velocity of the test fluid the frequency of the oscillator is a measurement of the velocity of the test fluid since the oscillator is pressure dependent. Alternate pulses of fluid will be directed to left output conduit 114 which will pass into resonator 127. If the frequency of the pulse in conduit 114 does not correspond to the resonant frequency of the resonator, the resonator will act as a fluid capacitor to give a continuous flow of fluid to left control nozzle 129. Fluid will also be directed by conduit 114 to restricted right control nozzle 133. Since left control nozzle 129 is not restricted while right control nozzle 133 is restricted, left control nozzle 129 will be at a higher pressure than right control nozzle 133 directing power fluid from nozzle 132 out right output conduit 138. If the frequency of oscillator 120 corresponds to the resonant frequency of resonator 126, the fluid from left control nozzle 129 will be shunted to conduit 114 by conduit 130, resonator chamber 127 and conduit 125, creating a low pressure region in the vicinity of the left control nozzle. The low pressure region in the vicinity of left control nozzle 129, when coupled with the higher pressure at right control nozzle 133, will switch the power fluid from right output conduit 138 to left output conduit 137. Thus it can be seen that there will be a fluid output from conduit 137 when the frequency of oscillator 120 corresponds to the frequency of resonator 126. Since the frequency of oscillator 120 is dependent on the pressure in ram tube 111, which is a function of the velocity of the test fluid, it can readily be seen that an output in conduit 137 will correspond to a particular velocity of the test fluid. If the velocity of the test fluid increases so that the frequency of oscillator 120 is greater than the resonant frequency of resonator 126 then the resonator will again act as a capacitor to give a continuous flow of fluid to left control nozzle 129 which will switch the power stream to outlet 138 from outlet 137. It is therefore readily apparent that fluid will flow from conduit 137 when the test fluid is in particular velocity region and for other velocities of test fluid conduit 138 will discharge power fluid.

In the embodiment of the invention disclosed in FIGURE 3 elements identical to those in FIGURE 2 have the same last two digits as the elements of FIGURE 2 only prefaced by the numeral 3. Output conduit 313 of oscillator 320 is vented to atmosphere by a variable restriction 370 placed in said conduit. Output conduit 314 is similarly vented to atmosphere and has a variable restriction 371 placed therein. A by-pass line 325 is placed in parallel with conduit 314 upstream of where conduit 314 discharges to atmosphere. Conduit 325 leads to a Helmholtz fluid resonator having a resonator chamber 327. While we have shown resonator chamber 327 as being rectangular in cross-section it is obvious that different configurations could be used without departing from the scope of our invention. A port 388 of smaller cross-sectional area than by-pass line 325, via conduit 328, leads to a left control nozzle 340 of a bistable fluid amplifier 350. Amplifier 350 has a source of power fluid (not shown) communicating with conduit 331 which, by power nozzle 333, directs fluid to interaction chamber 336. A left output conduit 337 and a right output conduit 338 communicate with interaction chamber 336 and are adapted to selectively receive the power fluid from power nozzle 333. A right control conduit 335 and a right control nozzle 334 are positioned adjacent power nozzle 333 and opposite left control conduit 328 and left control nozzle 340 respectively.

When the frequency of the test fluid in conduit 314 matches the frequency of the Helmholtz resonator 326 resonance occurs and the fluid from the left control nozzle 340 is shunted to conduit 314, by conduit 328 and resonator chamber 327, lowering the pressure in the vicinity of left control nozzle 340. Right control nozzle 334 will be maintained at atmospheric pressure by conduit 335 and when coupled with the lower pressure in the vicinity of left control nozzle 340 will direct the power fluid from nozzle 333 out left output passage 337. During non-resonant conditions resonator 327 will act as a fluid capacitor and direct test fluid to left control nozzle 340 deflecting the power fluid from power nozzle 333 to right output conduit 338. It is thus readily apparent that power fluid will issue from conduit 337 only when the test fluid is in a certain velocity range.

It will be shown that the embodiments shown are only exemplary and that various modifications can be made

We claim as our invention:
1. A fluid velocimeter for detecting a velocity range of a compressible test fluid comprising:
 (a) resonator means to receive a test fluid,
 (b) a fluid amplifier having a first control nozzle, a first output conduit adjacent said first control nozzle, a second control nozzle and a second output conduit adjacent said second control nozzle, a power jet receiving a power fluid and positioned to direct said power fluid to said output conduits,
 (c) said resonator including means to direct said power fluid of said fluid amplifier out a first of said output conduits upon said test fluid being in a certain velocity range, and
 (d) means to direct the power fluid of said amplifier out said second output conduit when said test fluid is not in said certain velocity range.

2. A device according to claim 1 wherein:
 (a) said resonator has an inlet port and a discharge port and said inlet port is adapted to receive said test fluid, and
 (b) a conduit communicates said discharge port and said first control nozzle of said amplifier.

3. A device according to claim 1 wherein said resonator has a fixed volume defining a resonator chamber.

4. A device according to claim 1 wherein bias means control said second control nozzle of said amplifier.

5. A fluid velocimeter comprising:
 (a) a fluid oscillator whose frequency is pressure dependent having a first and second output passage and supplied with a test fluid as a power source;
 (b) first means placed in parallel with said first output passage of said oscillator to direct said test fluid in said first output passage through said first means when said oscillator frequency is outside a certain predetermined range, and
 (c) a fluid amplifier having a power source, a first control nozzle, a first outlet passage adjacent said first control nozzle, a second control nozzle, a second outlet passage adjacent said second control nozzle, and
 (d) said first means coupled to said first control nozzle so as to direct fluid from said power source through said first outlet passage when said oscillator frequency is within said certain predetermined range, and through said second outlet passage when said oscillator frequency is outside said certain predetermined frequency range.

6. A device according to claim 5 wherein said fluid velocimeter includes means to direct said power fluid of said fluid amplifier out said first output passage when said oscillator test fluid is not directed through said first means.

7. A device according to claim 5 wherein said first means is a fluid resonator.

8. A device according to claim 6 wherein said first oscillator output passage is coupled to said second control nozzle of said fluid amplifier.

References Cited

UNITED STATES PATENTS

| | | | |
|---|---|---|---|
| 3,033,042 | 5/1962 | Clement et al. | 73—509 |
| 3,233,522 | 2/1966 | Stern | 137—81.5 X |
| 3,343,413 | 9/1967 | South et al. | 73—189 X |

RICHARD C. QUEISSER, *Primary Examiner.*

EDWARD D. GILHOOLY, *Assistant Examiner.*

U.S. Cl. X.R.

73—182, 212; 116—117; 137—81.5; 235—201